US006996702B2

(12) United States Patent
Xiang et al.

(10) Patent No.: US 6,996,702 B2
(45) Date of Patent: Feb. 7, 2006

(54) PROCESSING UNIT WITH CROSS-COUPLED ALUS/ACCUMULATORS AND INPUT DATA FEEDBACK STRUCTURE INCLUDING CONSTANT GENERATOR AND BYPASS TO REDUCE MEMORY CONTENTION

(75) Inventors: Shuhua Xiang, Fremont, CA (US); Li Sha, San Jose, CA (US); Ping Zhu, San Jose, CA (US); Hongjun Yuan, San Jose, CA (US); Wei Ni, San Jose, CA (US)

(73) Assignee: WIS Technologies, Inc., Santa Clara, CA (US)

( * ) Notice: Subject to any disclaimer, the term of this patent is extended or adjusted under 35 U.S.C. 154(b) by 428 days.

(21) Appl. No.: 10/209,109

(22) Filed: Jul. 30, 2002

(65) Prior Publication Data

US 2005/0228970 A1 Oct. 13, 2005

Related U.S. Application Data

(60) Provisional application No. 60/309,239, filed on Jul. 31, 2001.

(51) Int. Cl.
*G06F 9/34* (2006.01)
(52) U.S. Cl. ...................................... 712/221; 712/219
(58) Field of Classification Search ................ 712/219, 712/221
See application file for complete search history.

(56) References Cited

U.S. PATENT DOCUMENTS

| | | | |
|---|---|---|---|
| 5,228,130 A | 7/1993 | Michael ........................ 710/8 |
| 5,299,144 A * | 3/1994 | Bartkowiak et al. ........ 708/200 |
| 5,361,220 A | 11/1994 | Asano ........................ 708/401 |
| 5,398,078 A | 3/1995 | Masuda et al. ............. 348/699 |
| 5,633,897 A * | 5/1997 | Fettweis et al. ............ 375/341 |
| 5,694,127 A | 12/1997 | Tayama ........................ 341/67 |
| 5,706,001 A | 1/1998 | Sohn ........................... 341/63 |
| 5,706,002 A | 1/1998 | Meehan et al. ............... 341/67 |
| 5,799,201 A * | 8/1998 | Lorenz et al. ................ 712/36 |
| 5,835,145 A | 11/1998 | Ouyang et al. .......... 375/240.2 |
| 5,941,940 A * | 8/1999 | Prasad et al. ............... 708/523 |
| 6,038,675 A * | 3/2000 | Gabzdyl et al. ............ 713/600 |
| RE37,048 E * | 2/2001 | McCollum .................. 708/230 |
| 6,209,017 B1 * | 3/2001 | Lim et al. ................... 708/552 |
| 6,243,734 B1 | 6/2001 | Doshi et al. ................ 708/607 |
| 6,407,680 B1 | 6/2002 | Lai et al. ....................... 341/50 |
| 6,421,695 B1 | 7/2002 | Bae et al. ................... 708/402 |
| 6,463,445 B1 | 10/2002 | Suzuki et al. ............... 707/200 |
| 6,507,293 B2 | 1/2003 | Deeley et al. ................ 341/67 |
| 6,516,031 B1 | 2/2003 | Ishihara et al. ........ 375/240.16 |
| 6,523,071 B1 | 2/2003 | Klinger et al. ............... 710/10 |
| 6,552,673 B2 | 4/2003 | Webb ........................... 341/67 |
| 6,587,057 B2 | 7/2003 | Scheuermann ............... 341/67 |
| 6,593,860 B2 | 7/2003 | Lai et al. ...................... 341/50 |

(Continued)

*Primary Examiner*—Kenneth S. Kim
(74) *Attorney, Agent, or Firm*—Fenwick & West (57) ABSTRACT

A processing system includes an arithmetic logic unit (ALU) sub-system that allows data associated with a prior instruction to be preserved for use with a next instruction or subsequent instruction without having to reload the value using an intermediate register. The ALU sub-system includes a pair of ALUs communicatively cross-coupled with a pair of accumulators. The processing system also includes a data selector coupled to the ALU sub-system for use with memory contention prediction. The data selector includes a constant generator that controls storage of data associated with a previous instruction in a bypass element, and a selector to choose between data from a databus element and data stored in the bypass element.

3 Claims, 4 Drawing Sheets

U.S. PATENT DOCUMENTS

| | | |
|---|---|---|
| 6,647,061 B1 | 11/2003 | Panusopone et al. .. 375/240.12 |
| 6,701,405 B1 | 3/2004 | Adusumilli et al. ........ 710/308 |
| 6,728,862 B1 | 4/2004 | Wilson ........................ 712/14 |
| 2001/0016884 A1 | 8/2001 | Sato et al ..................... 710/29 |
| 2002/0199040 A1 | 12/2002 | Irwin et al. ................... 710/22 |
| 2003/0014457 A1 * | 1/2003 | Desai et al. ................. 708/520 |

* cited by examiner

PROCESSING UNIT WITH CROSS-COUPLED ALUS/ACCUMULATORS AND INPUT DATA FEEDBACK STRUCTURE INCLUDING CONSTANT GENERATOR AND BYPASS TO REDUCE MEMORY CONTENTION

CROSS-REFERENCE TO RELATED APPLICATIONS

This application claims priority under 35 U.S.C. § 119(e) to now abandoned U.S. Provisional Patent Application No. 60/309,239, entitled "Video Processing System with Flexible Video Format," filed Jul. 31, 2001, by He Ouyang, et al. (referenced hereinafter as "the Video Processing Application"), the subject matter of which is incorporated by reference in its entirety herein.

This application is generally related to and being filed concurrently with U.S. patent application Ser. No. 10/205,884, by Shuhua Xiang, et al., the subject matter of which is incorporated by reference in its entirety herein.

TECHNICAL FIELD

The present invention relates generally to a reduced instruction set computer (RISC) processor architecture, and in particular to a multiple stage pipeline architecture having an interleaved arithmetic logic unit (ALU) sub-system that improves the processor throughput.

BACKGROUND OF THE INVENTION

Computer systems typically employ a large number of storage registers connected to a central operational element known as an arithmetic logic unit (ALU). When a micro-operation is performed, the contents of particular registers are provided to the inputs of the ALU. The ALU performs the operation to obtain a result, which is then provided to a destination, which typically is a register.

Typically, the ALU is implemented as combination logic facilitating a register transfer operation from source registers via the ALU to destination registers, in one clock (pulse) time period by way of example. One problem with conventional ALUs is that they do not adequately address the situation where the value stored in a register is used by an instruction to obtain a result, and the value is overwritten with the result, even though the value may be needed for subsequent instruction(s).

Conventional processing systems attempt to address this situation by restoring the value of the register that has been overwritten so that a subsequent instruction may use the value. This approach is undesirable because the overwriting and reloading of this intermediate value increases processing throughput. As such, there is a need for a solution where the ALU preserves the register value, but in a manner that does not affect overall computational processor throughput.

SUMMARY OF THE INVENTION

The present invention overcomes the deficiencies and limitations of the prior art by providing a data processing system having an input address generator and an output address generator coupled in parallel to a processing unit having an interleaved arithmetic logic unit (ALU) sub-system. The interleaved ALU subsystem overcomes the drawbacks associated with conventional ALUs by preserving register contents for use in subsequent instructions so that the overall computational processor throughput is not sacrificed. Accordingly, the present invention avoids conventional processing approaches which overwrite the contents of a register with a result of an instruction and which require the overwritten data to be reloaded from memory.

According to one embodiment, the interleaved ALU subsystem comprises at least one pair of ALUs communicatively cross-coupled with a pair of accumulator registers. An address bus is coupled to the input and output address generators so as to provide read and write addresses associated with data stored in a storage device. In the embodiment, the processing unit is communicatively coupled to the storage device via a data bus. The processing unit executes the instructions and is further capable of respectively receiving and transmitting data associated with the instructions respectively from and to the storage device over the data bus.

The features and advantages described in this summary and the following detailed description are not all-inclusive, and particularly, many additional features and advantages will be apparent to one of ordinary skill in the art in view of the drawings, specification and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

BRIEF DESCRIPTION OF THE DRAWINGS

The teachings of the present invention can be readily understood by considering the following detailed description in conjunction with the accompanying drawings.

The figures depict a preferred embodiment of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF EMBODIMENTS

Introduction

A system, method, and other embodiments for processing instructions representing a program are described. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention with unnecessary details.

Reference in the specification to "one embodiment" or to "an embodiment" means that a particular feature, structure, or characteristic described in connection with the embodiments is included in at least one embodiment of the invention. The appearances of the phrase "in one embodiment" in various places in the specification are not necessarily all referring to the same embodiment.

Some portions of the detailed description that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It has proven convenient at times, principally for reasons of common usage, to refer to these signals as bits, values, elements, symbols, characters, terms, numbers, or the like. Furthermore, it has also proven convenient at times, to refer to certain arrangements of steps requiring physical manipulations of physical quantities as (modules) code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer-based system memories or registers or other such information storage, transmission or display devices.

One aspect in accordance with the present invention includes an embodiment of the process steps and instructions described herein in the form of hardware. Alternatively, the process steps and instructions of the present invention could be embodied in firmware or a computer program (software), and when embodied in software, could be downloaded to reside on and be operated from different platforms used by video processing systems and multimedia devices employed with real time network operating systems and applications.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The methods and displays presented herein are not inherently related to any particular computer or other apparatus. Various general-purpose systems may also be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the present invention as described herein, and any references below to specific languages are provided for disclosure of enablement and best mode of the present invention.

Reference will now be made in detail to several embodiments of the present invention, examples of which are illustrated in the accompanying drawings. Wherever practicable, the same reference numbers will be used throughout the drawings to refer to the same or like parts to avoid obscuring the invention with unnecessary details.

Processor System Overview

Figure 1:
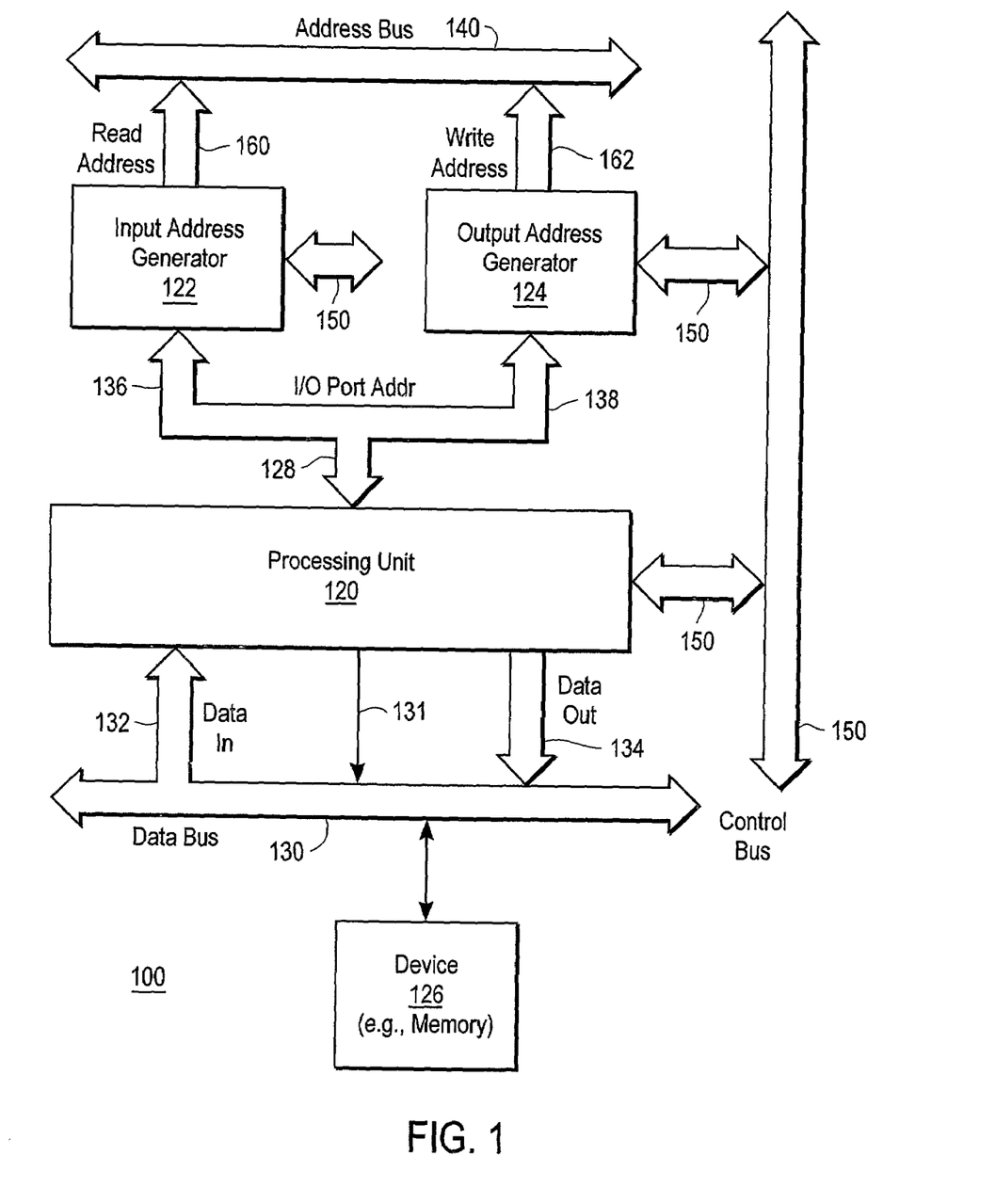
FIG. 1 is a block diagram of a processor system in accordance with one aspect of the present invention.

Referring to FIG. 1, there is shown an example of a processor system 100 comprising a processing unit 120, an input address generator 122, an output address generator 124, and a device 126. Device 126 may be a storage device such as memory, by way of example.

Processing unit 120 includes output signals lines 128. A data bus couples processing unit 120 to storage device 126. In particular, signal lines 132 provide read (data_in) signals retrieved from device 126 over data bus 130 to processing unit 120. Also, signal lines 134 provide write (data_out) signals from processing unit 120 over data bus 130 to device 126. Signal lines 131 provide read and write control signal from processing unit 120 to data bus 130, as will be described in more detail with reference to FIG. 2.

Output signal lines 128 provide input port addresses over signal lines 136 from processing unit 120 to input address generator 122. Output signal lines 128 also provide output port addresses over signal lines 138 to output address generator 124. For example, the signal lines 136 and 138 may be read or write and latch enable signal lines.

Processor system 100 also includes a control bus 150, which provides control commands to various components, including the input address generator 122, the output address generator 126, and processing unit 120.

The input address generator 122 generates and provides to address bus 140 read addresses over signal lines 160. The read addresses are associated with read data from a device 126 over data bus 130 into processing unit 120. The output address generator 124 generates and provides to address bus 140 write addresses over signal lines 162. The write addresses are associated with write data written to device 126 over data bus 130 from processing unit 120 upon completion of processing.

One benefit of including the input address generator 122 and the output address generator 124 in processor system 100 is that because the read addresses and the write addresses are generated externally to processing unit 120, processing unit 120 need not include functionality to ascertain the read and write addresses, respectively. Accordingly, processing unit 120 can thereby process batch data seamlessly and devote its resources to other processing tasks. Data bus 130 couples the processing unit 120 to the device 126 and facilitates the transfer of read data over signal lines 132 and write data over signal lines 134. Typical video processing applications that can be performed by processing 120 include burst data move, matrix transposing, and video column processing, by way of example.

Figure 2:
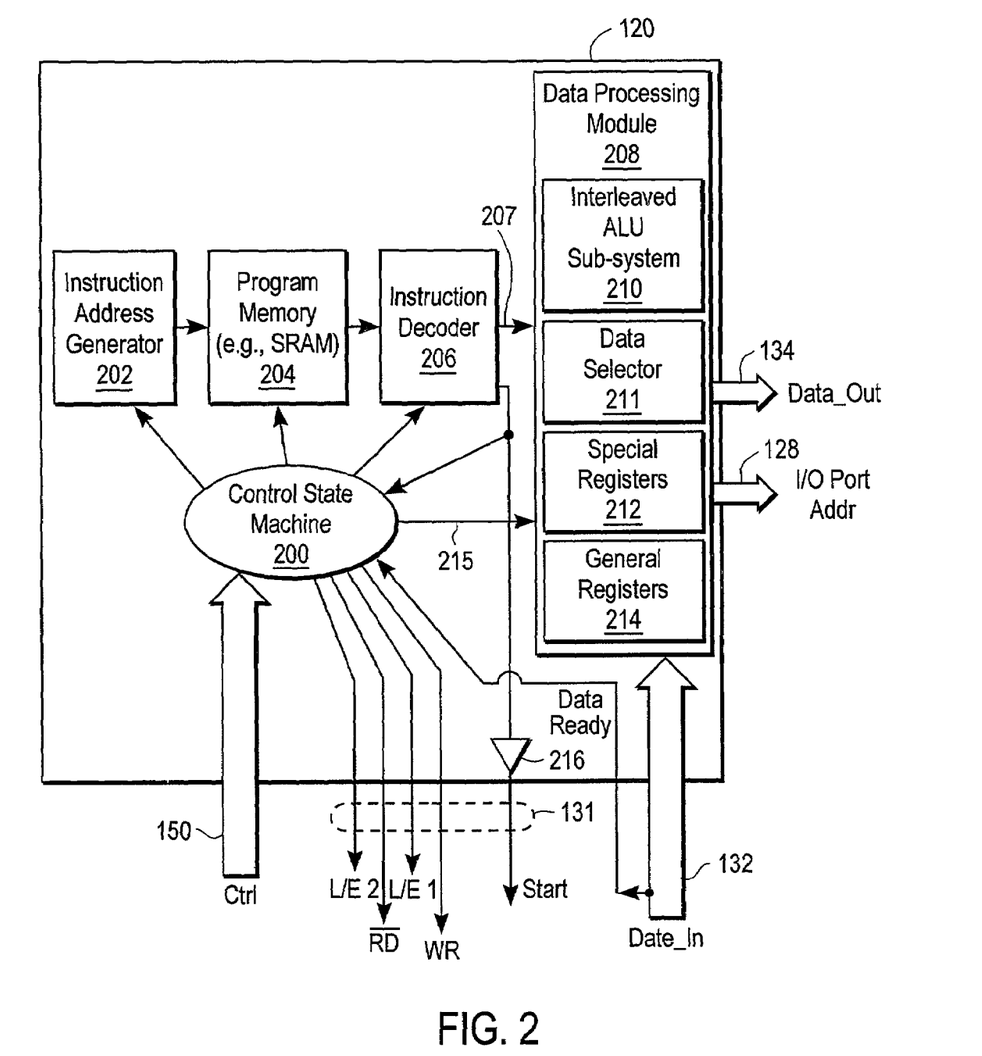
FIG. 2. is a block diagram of one embodiment of a processing unit for the system of FIG. 1.

FIG. 2 shows one embodiment of processing unit 120 in accordance with the present invention. Processing unit 120 includes a control state machine 200, an instruction address generator 202, a program memory 204, an instruction decoder 206, and a data processing module 208 (also known as a data path module). Instruction address generator 202 performs one or more address calculations associated with instruction words representing the program to be processed by the data processing module 208.

Control state machine 200 is coupled to the instruction address generator 202, the program memory 204, the instruction decoder 206, and the data processing module 208. Control state machine 200 can be conventionally designed to provide control for the behavior of sequential instructions to be processed by the processing unit 120, as will be understood by those skilled in the art. Additional details of control state machine 200 are not described so as to avoid obscuring the present invention with unnecessary details.

Program memory 204 stores the instructions (and/or microinstructions), typically at consecutive memory locations. It will be appreciated that such instructions can be loaded in program memory 204 as is known in the art. These instructions are generally executed sequentially one at a time. According to one particular implementation, program memory 204 is a static random access memory (SRAM). Although not shown explicitly, those of skill in the art will appreciate that program address generators that calculate the address of subsequent instructions after the execution of a current instruction is complete can be utilized in order to provide the instruction sequencing associated with execution of the instructions. The program memory 204 also receives an address generated by the instruction address generator 202 so as to index the corresponding instruction word stored therein. The program memory 204 further includes an output signal line coupled to the instruction decoder 206 in order to provide the instruction words indexed.

Instruction decoder 206 generally functions to convert the instruction binary code arising from (e.g., n-bit) coded inputs received from the program memory 204 into a plurality of (e.g., $2^n$) unique outputs, representing all of the address and control signals for operating the data processing module 208. These control signals are provided over signal lines 207 to the data processing module 208 and are a function of the output of the instruction decoder 206. In particular, instruction decoder 206 can be an n x m decoder capable of receiving the n-bit coded instruction words from the program memory 204 and of determining m corresponding decoded instructions or microinstructions (e.g., m=$2^n$) to be executed by the data processing module 208. Both n and m are integers. Each of the m outputs represents one of the combination of n binary input variables. Typically, an example signal is activated to select one of the m decoded microinstructions. By way of example, 16-bits of a microinstruction binary code can be driven to the decoder data output, which is then multiplexed to either the data bus 130, or address bus 140 by the control commands transmitted over the control bus 150. In one embodiment, a hierarchical instruction set may be designed so as to reduce the combinational logic complexity and to improve the timing of the decoder 206. Once a decoded instruction is generated by the instruction decoder 206, a START command is generated by the control state machine 200. This START command can be temporarily stored in buffer 216 before being transmitted to the control bus 150 for use elsewhere in processor system 100.

Data processing module 208 processes input read data (data_in) signals received on signal lines 132. Module 208 also processes output write data (data_out), which is provided over signal lines 134. The processing function can perform arithmetic and logic calculations depending upon the decoded instructions (and/or microinstructions, if applicable) determined by decoder 206. Data processing module 208 includes an interleaved arithmetic logic unit (ALU) sub-system 210, data selector 211, special registers 212, and general registers 214.

Still referring to FIG. 2, one embodiment of control signal lines 131 includes a first latch enable signal line (L/E 1), a second latch enable signal line (L/E 2), read signal lines (RD), and write signal lines (WR).

Figure 3:
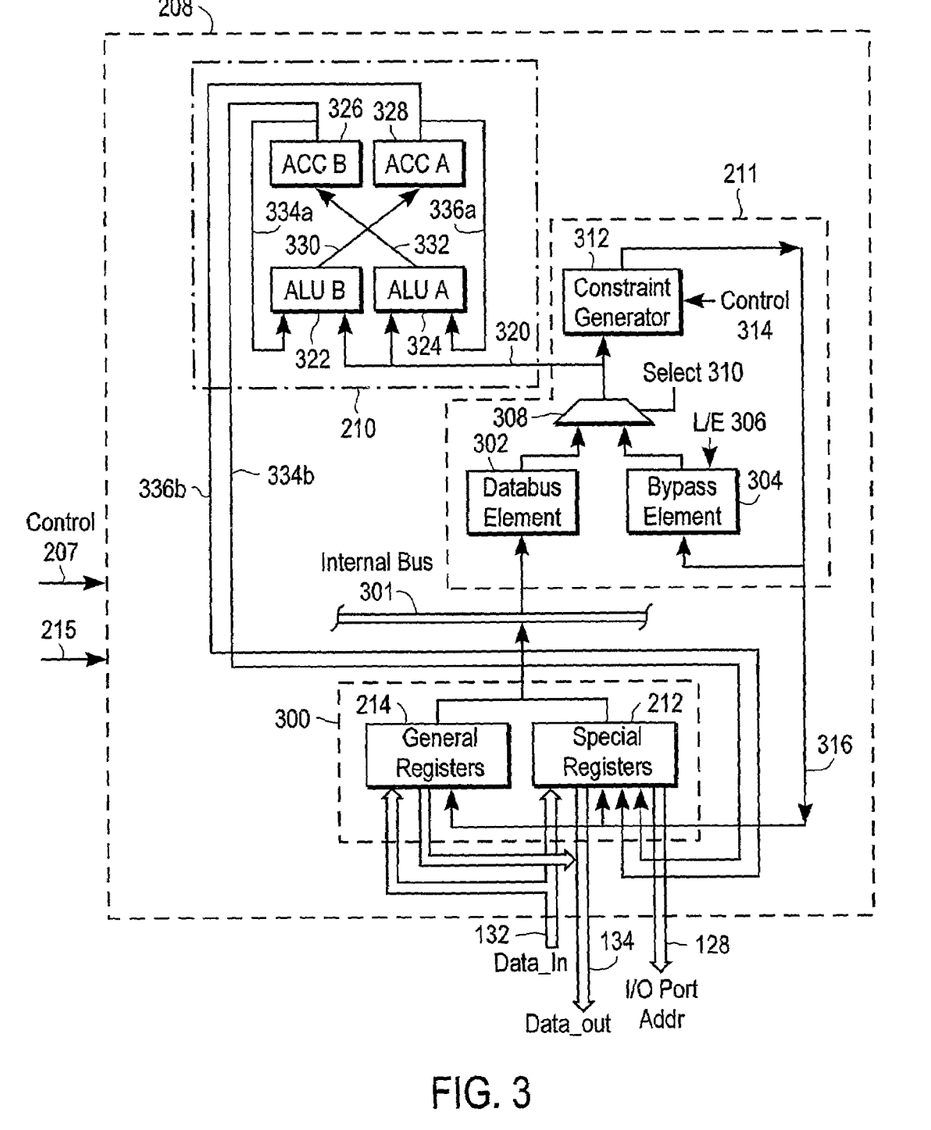
FIG. 3 is a detailed block diagram of one embodiment of the data processing module of FIG. 2 in accordance with an aspect of the present invention.

In FIG. 3, special registers 212 receive read data (data_in) from the device 126 over data bus 130 and signal lines 132. Additionally, special registers 212 provide write data (data_out) to device 126 over signal lines 134 and data bus 130. An Input/Output (I/O) port address signal line 128 couples the processing unit 120 to the input address generator 122 for read operations, and to output address generator 124 for write operations. This indication of read or write status facilitates an I/O addressing scheme applied to device 126, which can be analogized to being a device external to processor system 100. Using this analogy, those of skill in the art will understand that other devices coupled to the data bus 130 in FIG. 1 similarly to device 126 can be addressed by processor system 100 using the read and write indication along I/O address port signal line 128.

FIG. 3 depicts dashed box representative of I/O registers 300, which includes the special registers 212 and general registers 214, for convenience. One advantage of addressing the device 126 and other devices coupled to data bus 130 using input and output addresses is that such addressing provides processor system 100 with a simple and easily adaptable addressing scheme that can be applied to any type of device. For example, a motion compensation engine, variable length coding module, and multi-channel direct memory access device are exemplary devices that can be addressed by processor system 100 similar to device 126. Those of ordinary skill in the art will appreciate that a conventional addressing scheme may be used to access the external device.

General registers 214 receive pre-fetched data (e.g., data_in) over data bus 130 from the device 126. When write data (e.g., data_out) is to be written from the I/O registers 300 to the device 126, the general registers 214 outputs a write-data signal (not shown) to the control bus 150 to permit indication to the device 126 that write data is about to be placed on the data bus 130. Thereafter, the write data can be latched by device 126 and stored at the appropriate write address.

Data processing module 208 includes an interleaved ALU sub-system 210, special registers 212 and general registers 214, and data selector 211. Data selector 211 is coupled to an internal data bus 301, and comprises a databus element 302, a bypass storage element 304, a selector 308, and a constant generator 312.

According to one particular embodiment, by way of example, data processing module 208 provides 16-bit RISC operations and control. In that embodiment, a large register file is not required, but instead, a 3-stage pipeline control protocol can be used. Both single bit and fixed length burst input/output (I/O) is supported by this embodiment, and the general registers 212 and special registers 214, respectively, can be implemented as a 16×16 register file which can be read and written to by external memory device 15 using 4, 8 and 16 bursts, by way of example. During an I/O cycle which include read and write cycles, interruption functions are disabled, although nested interruption is generally supported. Although not explicitly shown in FIG. 3, but as will be understood by those of ordinary skill in the art, special register 212 may include an internal stack depth of up to 256 words for use with each instruction word being of 18-bit width, by way of example. The program access range is selected to be 13-bits, and conditional and unconditional direct jump (JMP), relative jump and function call features are supported.

Once read data (data_in) is received by the I/O registers 300, the read data is then provided from the I/O registers 300 over the internal data bus 301 to the databus element 302. In one embodiment according to the present invention, databus element 302 is a register used to store selected data received from the I/O registers 300 via internal bus 301. Those of skill in the art will appreciate that databus element 302 functions as a selection register.

Bypass element 304 generally functions to hold feedback data output from the constant generator 312. In general, bypass element 304 stores data associated with a previous instruction for use with memory contention prediction. A latch enable (L/E) signal 306 is provided as an input to bypass element 304 in order to determine when data associated with a previous instruction should be latched. If memory contention associated with storage access to the same registers within I/O registers 300 occurs, the content of databus element 302 can be used for the next instruction or for subsequent instructions. Memory contention occurs when read and write instructions to the same address occur in the same clock, as those of ordinary skill in the art will appreciate. The memory contention prediction can be implemented in a variety of ways in addition to the use of the bypass element 304 and databus element 302 discussed here.

In general, selector 308 determines whether data read from a source register within I/O registers 300 or data associated with a previous instruction and saved in the bypass element 304 to perform memory contention prediction will be selected for processing by the interleaved ALU subsystem 210. Selector 308 includes an input selection signal line 310, which is used to enable the selection of one of the two inputs provided to selector 308, namely inputs from databus element 302 and from bypass element 304. According to one embodiment, selector 308 may be implemented as a multiplexer.

Constant generator 312 receives an input control signal on signal line 314 and functions to generate a constant associated with an instruction. For example, one function of the constant generator 312 is to receive read data from the databus element 302, and to provide an output on signal line 316. This output on signal line 316 represents some constant which is generated as a result of the read data, and which will be part of an instruction and/or an operand that will be processed by the interleaved ALU sub-system 210 in a next instruction or a subsequent instruction. Output on signal line 316 is also transferred to the I/O registers 300 when write data is written thereto prior to being transferred to the device 126, or when a constant needs to be stored in a destination register. By way of example, constant generator 312 includes conventional combinational logic to implement a bit set, bit clear, increment, and decrement instructions. The input control signal 314 can be generated by the instruction decoder 206 and provided over signal line 207.

Interleaved ALU sub-system 210 comprises a pair of accumulator registers 328 and 328 communicatively cross-coupled to a pair of arithmetic and logic units (ALUs) 322 and 324. In particular, accumulator 328 includes an output coupled to a first input of ALU 324 via signal line 336a. Similarly, accumulator 326 includes an output coupled to a first input of ALU 322 via signal line 334a. ALUs 322 and 324 each includes a second input coupled to the output of selector 308, as indicated by signal line 320, to receive either the read data from the databus element 302 or the data stored in the bypass element 304. ALU 324 includes an output coupled to an input of accumulator 326 as indicated by signal line 332. ALU 322 includes an output coupled to an input of the accumulator 328 as indicated by signal line 330.

Accumulator 326 provides an output to special registers 212, as indicated by signal line 334b. Accumulator 328 provides an output to special registers 212, as indicated by signal line 336b. Accordingly, the outputs of accumulators 326 and 328 are directly coupled to the I/O registers 300. An advantage of doing so allows the pair of ALUs and the pair of accumulators to preserve register values that may be needed for processing of a next instruction or a subsequent instruction without having to reload such value as in conventional techniques. Further details of an exemplary technique for operating the interleaved ALU subsystem 210 are described subsequently so that the operation of the cross-couplings of signal lines between the pair of ALUs 322, 324 and the pair of accumulators 326, 328 will become readily apparent.

One implementation of the I/O registers 300 will now be discussed with reference to Table 1. For example, a register A may be used to store the result from the interleaved ALU sub-system 210 upon completion of an instruction execution cycle. In this example, the ALUs 322 and 324 can provide their results to register A as a destination register. Here, register A would be registers for accumulators 326 and 328. A register B can be used as an auxiliary register. For example, a multiplication operation can be implemented in the interleaved ALU sub-system 210, with the auxiliary register B providing a multiplier and with the internal bus 301 providing a multiplicand fetched from the general registers 214 or provided from program memory 204 over signal line 207. A register C can be used as a count register in the implementation of control loops. For example, the don't carry jump non-zero instruction (DCJNZ) causes the C register to be decreased and compared with zero to determine the program branch. The register C can also be used as a pointer to access the register group RX. A register D can be used to represent data and relative registers, whose values are used to offset a base branch addressed applicable to a jump JMP,D instruction, where the program counter is loaded with 14-bit direct address D. Register D can also be used as a pointer to the register group RX. Additional details of Table 1 and a corresponding exemplary instruction set are described in the Video Processing Application, the subject matter of which is incorporated by reference.

By way of example, the interleaved ALU sub-system 210 can perform eight types of instructions, including: addition, addition with carry, subtraction, subtraction with carry, logic and, logic or, shift right and shift left. Any of the two element instructions will typically use register A to store one of the operands and the destination register. The other operand can be obtained from registers B, C, D, register files RX, input port data register PDin, or a direct constant number which will be specified by certain parts of the instruction.

TABLE 1

Exemplary General and Special Registers

| Register Name | Register Type | Width (bits) | Description | Reset Value | | | |
|---|---|---|---|---|---|---|---|
| Register A | Special | 16 | Accumulator | 0x0000 | | | |
| Register B | Special | 16 | Auxiliary register | 0x0000 | | | |
| Register C | Special | 16 | Count register | 0x0000 | | | |
| Register D | Special | 16 | Relative register | 0x0000 | | | |
| PA | Special | 16 | Address port register | 0x0000 | | | |
| PD$_{in}$ | Special | 16 | Input data port register | 0x0000 | | | |
| PD$_{out}$ | Special | 16 | Output data port register | 0x0000 | | | |
| PSR | Special | 16 | Processor status register | Z (Zero) | Set when the result of instruction is zero | 0x0 | |
| | | | | C (Carry) | The resulting carry of the ALU operation | 0x0 | |
| | | | | V (Overflow) | Assume all ALU add and sub are signed, if the result exceeds the range of signed number, OF bit will be set | 0x0 | |
| | | | | N (Negative) | When the result of ALU is negative, the NEG bit is set | 0x0 | |
| | | | | EI | This bit is only accessible by SETFlag instruction, EI = 1 will enable the interruption, EI = 0 will disable the interruption | 0x0 | |
| RX (0~15) | General | 16 | Register file | n/a | | | |
| Program Counter | n/a | 13 | Program Counter | 0x0000 | | | |

A processor status register (PSR) can include a zero-bit indicator which is set when the result of an instruction is zero. The PSR also includes a carry-bit indicator of a carry being valid as a result from ALU operation. Additionally, the PSR includes an overflow bit wherein an assumption is made that all ALU addition and subtraction instructions include the signed bit. If the result exceeds the range of a signed number, the overflow bit is set to indicate the result is out of range. The PSR also includes a negative bit which indicates that the result of an instruction is negative. The Enable Interrupt (EI) bit functions to allow the interrupt functions of processing unit 120.

Operation of the Interleaved ALU Sub-System

Figure 4:
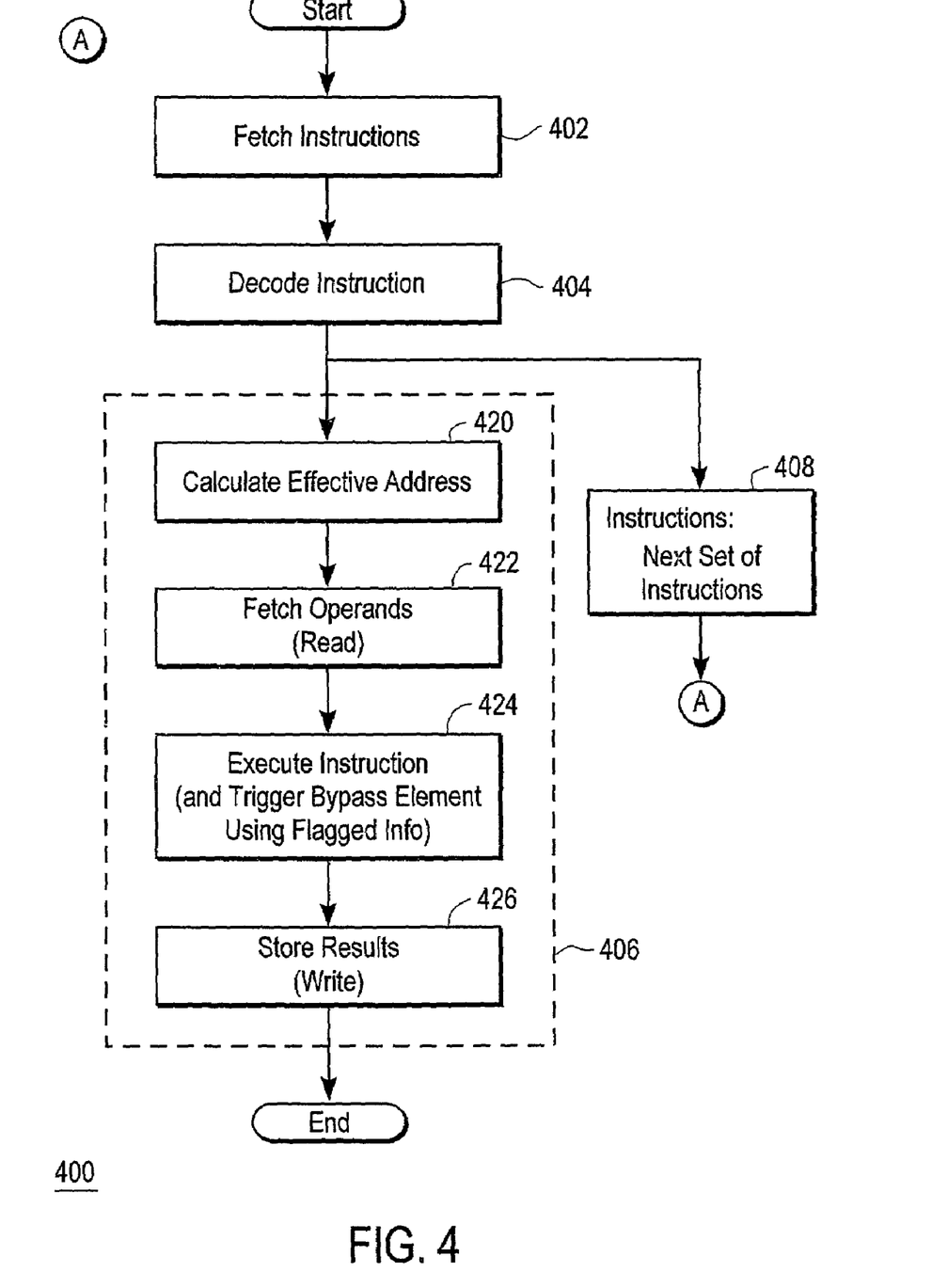
FIG. 4 is a flowchart showing an exemplary embodiment of an instruction cycle in accordance with an aspect of the present invention.

The operation of the interleaved ALU sub-system 210 is now described with respect to the flowchart 400 shown in FIG. 4. Generally, each instruction takes three stages to complete according to the pipeline control in accordance with an aspect of the present invention. The three stages shown in FIG. 4 are: (1) fetching the instruction 402; (2) decoding the instruction 404; and (3) executing the instruction 406. After these three stages are described in more detail, a general overview of the pipeline processing representing an aspect of the present invention will be described. Additionally, yet another aspect directed to the interleaved ALU sub-system 210 preserving and using intermediate results of a present instruction for processing of a next instruction or a subsequent instruction without having to reload the intermediate value will be described with respect to executing 406 the instruction.

After initialization or a system reset, the processing unit 120 will start with the instruction indicated by the program counter (PC). According to one embodiment of the present invention, the PC by default will advance by 1 with each clock. However, in the situation where a jump, subroutine call, or an interrupt occurs, the PC will be loaded with a new value. In the situation of a jump or subroutine call, the new address is loaded from the data bus 301, which is driven by the instruction decoder 206. In the situation where a return from subroutine call or from an interrupt occurs, the saved return address is popped through the stack and loaded into the program counter (PC). When an interruption occurs, the new address is loaded as an interruption vector, which is driven by a programmable interruption controller (PIC), which can be an external device to the processing unit 120, although not explicitly shown. In addition to direct program branching, the PC can also load a relative new branch address. In the situation where a relative branch occurs, the address from the data bus 301 is offset by contents of register D before being loaded into the program counter.

In FIG. 4, fetching instructions 402 comprises loading the instruction from the program memory 204 with the corresponding address being provided by the program counter.

Decoding 404 begins with loading of the instructions fetched from the program memory 204. These instructions are then decoded into data path and address path control signals for applicable devices (e.g., like memory device 126). The decoding 404 involves converting the binary coded instruction inputs into a plurality of outputs, one for each of the combination of the binary inputs. Those of skill in the art will understand that decoding is applicable to conventional processing systems, such as RISC and CISC-based systems.

During execution 406 of an instruction, the data processing module 208 calculates 420 the effective address of the instructions and fetches (e.g., read) 422 the appropriate operands from source registers (e.g., I/O registers 300) and/or the databus element 302 and bypass element 304. These operands will be executed 424 by the interleaved ALU sub-system 210. The constant generator 312 is utilized, if needed, as described previously. The results of the interleaved ALU sub-system 210 are stored 426 at either a destination register (e.g., the I/O registers 300) or in the bypass element 304.

As part of the execution 424 of the instruction, the output of each of the ALUs 322, 324 are provided in one clock to one of the accumulators, 326, 328, respectively. As noted previously, these accumulators 326, 328 also function as a part of the special registers 212, such as for example register A already described. The constant generator 312 provides those constants needed to perform certain instructions, such as for example, load from memory or from register, moving data between registers, logic and, and logic or. The output of constant generator 312 drives the bypass element 304, as well as the general registers 214 and the special registers 212. At a certain clock, data is read from the I/O registers 300 onto internal bus 301, and into the databus element 302. At the next clock, data is selected from the databus element 302 or bypass element 304 and read into the constant generator 312.

A. Pipeline Processing Overview

Still referring to FIG. 4, pipeline processing of the instruction stream is further described with reference to the next set of instructions 408. One aspect in accordance with the present invention includes an instruction pipeline, wherein consecutive instructions are read from the general registers 214, while previous instructions continue to be executed contemporaneously therewith. For example an instruction cycle for a processing system 120 can be pipeline processed according to the following sub-processes. In a first clock, a first instruction indicated by the program counter is fetched. In the second clock, the program counter is incremented, the first instruction is decoded and memory contention prediction is performed. Also in the second clock, a second instruction indicated by the program counter is fetched. In the third clock, the program counter is incremented, the second instruction is decoded, and the first instruction is executed. Also in the third clock, the third instruction indicated by the program counter is fetched. In the fourth clock, the program counter is incremented, the second instruction is executed, and the third instruction is decoded. Also in the fourth clock, the fourth instruction indicated by the program counter is fetched. Those skilled in the art will understand that this pipeline process continues with subsequent instructions.

Reference is now made to the following two instructions, which are performed sequentially, by way of example. The instruction MOV R0, R1 will be referred to as Eq. (1), and the instruction MOV R3, R2 will be referred to as Eq. (2).

MOV R0, R1     (1)

MOV R3, R2     (2)

The instruction MOV R0, R1 entails moving the contents of register R1 to register R0. Similarly, the instruction MOV R3, R2 entails moving the contents of register R2 to register R3. Without pipeline processing, these two MOV instructions would take 4 clock cycles because each of these MOV instructions require two clocks, namely one clock to load the registers R1 (R2) and R0(R3) with data, and another clock to perform the actual move.

In accordance with one aspect of the present invention, by pipelining the two MOV instructions, the instructions can be executed in a time period reduced by one clock. Table 2 illustrates an example where during the first clock ($t_0$), the value of register R1 is read into the databus element 302 from the I/O registers 300, while in the next clock ($t_1$), the data in the databus element 302 is transferred back (i.e., written) to register R0. Also in the same clock ($t_1$), the value of register R2 is read from the I/O registers 300 into the databus element 302. In the next clock ($t_2$), the value of databus element 302 is written to the destination, register R3. It will become evident to those skilled in the art that one benefit of pipeline processing is that n clocks can be used to complete the n+1 instructions conventionally requiring n+1 clocks, where n>1.

TABLE 2

Exemplary Pipeline Instruction Reduction

| clock | READ | WRITE |
| --- | --- | --- |
| $t_0$ | R1 | dc |
| $t_1$ | R2 | R0 |
| $t_2$ | Dc | R3 |

B. Interleaved ALU Sub-System

In accordance with the present invention, yet another aspect directed to the interleaved ALU sub-system 210 preserving and using an operand of a present instruction for processing a subsequent instruction without having to save and reload the operand will now be described with an example of the process of executing 424 an instruction. To illustrate this aspect, reference is now made to the following sequence of instructions, which for convenience will be referred to as Eqs. (3)–(8). In the following discussion, reference is also made to the registers of Table 1, with more specific details concerning the exemplary instruction set found in the Video Processing Application. Also, reference will be made to the pair of ALUs 322, 324 and pair of accumulators 326, 328 of FIG. 3. It will become apparent to those skilled in the art that the following example traces the control flow for pipeline processing.

LOAD A, x     (3)

LOAD C, y     (4)

SUB A, C     (5)

JMP (location)     (6)

LOAD C, z     (7)

SUB A, C     (8)

To implement Eq. 5, the value x is loaded into register A at two previous clocks (t-2). In particular, the value x can be read from device 126 previously, and placed into a special register 212, such as accumulator 328 representing register A at clock (t-2). At a previous clock (t-1), the value of y is loaded into register C. The loading of register C can be undertaken by having register C transfer the value y to the databus element 302 at clock (t-1). At the present clock (t), Eq. 7 is executed whereby selector 308 selects the value y from the databus element 302, and provides the value y over signal line 320 to one input of ALU 324. In the same clock (t), accumulator 328 provides the value x over line signal 336a to the other input of ALU 324. The subtraction instruction indicated by Eq. 7 will yield a result x–y (i.e., x minus y) which is stored in register representing accumulator 326. This is advantageous because the result of Eq. 7 does not overwrite the value x, which is stored in register A. By contrast, conventional ALUs would overwrite the value x in register A with the result of the instruction indicated by Eq. 7 (i.e., x–y), and would require that the value x be reloaded from device 126 prior to Eq. 10 being executed.

Instead, one aspect in accordance with the present invention enables the value stored in register A, namely "x," to be preserved for the upcoming Eq. 10, which thereby improves computational throughput of processing system 120 because additional instructions to reload the value x are not required.

It will become apparent to those of skill in the art that the interleaved ALU sub-system 210 is not limited to the embodiment of one pair of ALUs and one pair of accumulators, as shown. Rather more the one pair of ALUs and more than one pair of accumulators may be used in any combination to provide improved efficiency during instruction execution of data processing.

It will be appreciated by those skilled in the art that the time required for each instruction to complete its function is related to the nature of the instruction itself and the manner in which the instruction is executed. However, so as not to obscure the present invention with unnecessary details, an assumption is made that the design of an instruction pipeline will be the most efficient if the instruction cycle is partitioned into sub-processes of equal duration. Those of skill in the art will recognize that this assumption does not in any way limit the scope of the present invention. The reason for this is that pipeline processing is associated with a feature of overlapping the execution of two or more instructions in sequence by applying a temporal offset to a subsequent instruction in sequence. Under the assumption that each instruction of an instruction set can be processed in the same number of clock cycles, a pipeline can be designed wherein this temporal offset is selected to be one clock cycle. In accordance with this assumption, the pipeline processor is enabled to effectuate the processing of one instruction at each clock cycle.

While particular embodiments of the invention have been described, it is, as it is intended that the invention be as broad in scope as the art will allow and that the specification be read likewise.

Although the invention has been described in considerable detail with reference to certain embodiments, the present invention is not intended to be limited to these specific embodiments. As will be understood by those of skill in the art, the present invention may be embodied in other specific forms without departing from the essential characteristics thereof. Accordingly, the present invention is intended to embrace all such alternatives, modifications and variations as fall within the spirit and scope of the appended claims and equivalents.

What is claimed is:

1. A data processing system enabled to process instructions representing a program operable upon data in a storage device, comprising:

a first address generator coupled to an address bus to provide read addresses associated with data stored in the storage device;

s a second address generator coupled to the address bus to provide write addresses associated with data stored in the storage device;

an arithmetic logic unit (ALU) sub-system capable of executing the instructions the ALU sub-system coupled to the storage device, the first address generator and the second address generator, the ALU sub-system including a first ALU having a first input, a second input, and an output, a second ALU having a first input a second input, and an output, a first accumulator having an input and an output, the input of the first accumulator coupled to the output of the second ALU and the output of the first accumulator coupled to the second input of the first ALU, and a second accumulator having an input and an output, the input of the second accumulator coupled to the output of the first ALU and the output of the second accumulator coupled to the first input of the second ALU;

a constant generator having an input and an output, the input of the constant generator coupled to the first input of the first ALU and to the second input of the second ALU, the constant generator capable of providing feedback data based on data selected from a group of data comprising data read from the storage device and data associated with a previous instruction;

a bypass element having an input and an output, the in input of the bypass element coupled to the output of the constant generator, wherein the feedback data is latched in the bypass element for subsequent retrieval; and a select element having a first input, a second input, and an output, the first input of the select element coupled to the storage device, the second it of the select element coupled to the output of the bypass element, and the output of the select element coupled to the input of the constant generator, the select element capable of selecting between data selected from a group of data comprising data read from the storage device and data associated with a previous instruction, wherein the constant generator, the bypass element and the select element are configured to manipulate feedback data to minimize memory contention by reducing a number of memory accesses.

2. The data processing system according to claim 1, further comprising a processing unit coupled to the device, wherein the processing unit comprises:

a third address generator capable of performing one or more address calculations to generate an instruction address;

coupled to the third address generator, a program memory capable of storing the instructions, and of receiving the instruction address from the third address generator to index a particular instruction, the program memory including an output enabled to provide the particular instruction indexed;

coupled to the program memory, a decoder capable of receiving the particular instruction from the program memory and determining a corresponding decoded instruction to be executed;

coupled to the decoder, a data processing module capable of performing arithmetic and logic calculations upon the decoded instruction, wherein the data processing module includes the ALU sub-system, the constant generator, the bypass element, and the select element; and a state machine capable of controlling instruction processing, the state machine coupled to the third address generator, the program memory, the decoder and the data processing module.

3. The data processing system according to claim 2, wherein said processing unit comprises a RISC processor.

* * * * *